(12) United States Patent
Inoue (10) Patent No.: US 6,657,354 B2
(45) Date of Patent: Dec. 2, 2003

(54) DYNAMO-ELECTRIC MACHINE HAVING COMMUTATOR AND MANUFACTURING METHOD THEREOF

(75) Inventor: Keiji Inoue, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 35 days.

(21) Appl. No.: 09/991,927

(22) Filed: Nov. 26, 2001

(65) Prior Publication Data

US 2002/0067097 A1 Jun. 6, 2002

(30) Foreign Application Priority Data

Dec. 6, 2000 (JP) ........................................ 2000-371360
Oct. 4, 2001 (JP) ........................................ 2001-308502

(51) Int. Cl.⁷ .............................................. H01R 39/04
(52) U.S. Cl. ......................... 310/233; 310/236; 29/596
(58) Field of Search ................................. 310/233, 236, 310/237

(56) References Cited

U.S. PATENT DOCUMENTS 4,426,594 A * 1/1984 Hirano et al. ............... 310/233
4,525,957 A * 7/1985 Daniels ......................... 451/63
4,682,446 A * 7/1987 Woodall et al. ................ 451/59
4,763,036 A * 8/1988 Yu .............................. 310/233
5,049,772 A * 9/1991 Mottier et al. ............... 310/233
5,065,651 A * 11/1991 Amey .......................... 82/1.11
5,454,284 A * 10/1995 Sbalchiero et al. ........... 82/1.11

FOREIGN PATENT DOCUMENTS

| JP | B2-57-43990 | 9/1982 | |
| JP | B2-60-34345 | 8/1985 | |
| JP | 03273848 A | * 12/1991 | ........ H02K/13/00 |
| JP | 05161317 A | * 6/1993 | ........ H02K/13/00 |
| JP | A-7-59299 | 3/1995 | |
| JP | A-7-303353 | 11/1995 | |

* cited by examiner

Primary Examiner—Joseph Waks
(74) Attorney, Agent, or Firm—Posz & Bethards, PLC (57) ABSTRACT

A dynamo-electric machine includes a commutator secured around a rotatable shaft and a plurality of carbon brushes placed in sliding contact with the commutator. The commutator has a sliding contact surface placed in sliding contact with the carbon brushes. The sliding contact surface of the commutator has a plurality of peaks and valleys that are substantially regularly and alternately arranged in both axial and circumferential directions of the commutator.

9 Claims, 6 Drawing Sheets

DYNAMO-ELECTRIC MACHINE HAVING COMMUTATOR AND MANUFACTURING METHOD THEREOF

CROSS REFERENCE TO RELATED APPLICATION

This application is based on and incorporates herein by reference Japanese Patent Application No. 2000-371360 filed on Dec. 6, 2000 and Japanese Patent Application No. 2001-308502 filed on Oct. 4, 2001.

BACKGROUND OF THE INVENTION

1. Field of the Invention

The present invention relates to a dynamo-electric machine, specifically a dynamo-electric machine having brushes for supplying electric power to a commutator and also to a method for manufacturing the same.

2. Description of Related Art

In a dynamo-electric machine (e.g., direct current motor), electric power is supplied to an armature (windings of a core) through brushes that are in sliding contact with an outer peripheral surface (sliding contact surface) of a commutator. Each brush is received in a corresponding brush case integrally formed in a brush holder.

In such a dynamo-electric machine, a roundness of the outer peripheral surface of the commutator, a size of each step formed between corresponding adjacent commutator segments, a deviation between a position of each brush and a corresponding rotational position of the armature (commutator) or the like are the factors that need to be considered to achieve appropriate commutation (restraining the disturbance of the commutation) of the dynamo-electric machine (commutator and brushes) and to restrain deterioration of motor efficiency, generation of vibrations and vibrational noise and/or the like. Thus, in order to restrain the disturbance of the commutation and to restrain the generation of the vibrations and vibrational noise, the roundness of the commutator has been improved by improving processing precision of the commutator to provide an ideal sliding contact surface (uniform sliding contact surface) of the commutator, which is in sliding contact with sliding contact surfaces of the brushes.

By improving the processing precision of the commutator and thereby improving the roundness of the sliding contact surface of the commutator, the vibrations and vibrational noises generated between the commutator and the brushes can be reduced. However, the improvement in the roundness of the sliding contact surface of the commutator pauses another disadvantage. That is, as a result of the improvement in the roundness of the sliding contact surface of the commutator, the sliding contact surface of the commutator closely and tightly fits or sticks with the opposing sliding surface of each brush. This generally causes a phenomenon known as "stick-slip" occuring between the commutator and the brushes, and hence rotation of the commutator results in squealing noise generated between the commutator and the brushes and/or abnormal wearing of the brushes.

SUMMARY OF THE INVENTION

The present invention addresses the above disadvantages. Thus, it is an objective of the present invention to provide a dynamo-electric machine capable of restraining disturbance of commutation, reduction of motor efficiency, generation of vibrations and vibrational noise in an armature as well as generation of squealing noise and abnormal wearing of brushes. It is another objective of the present invention to provide a method for manufacturing such a dynamo-electric machine.

To achieve the objectives of the present invention, there is provided a dynamo-electric machine including a commutator secured around a rotatable shaft and a plurality of carbon brushes placed in sliding contact with the commutator. The commutator has a sliding contact surface placed in sliding contact with the plurality of carbon brushes. The sliding contact surface of the commutator has a plurality of peaks and valleys that are substantially regularly and alternately arranged in both axial and circumferential directions of the commutator. Alternatively, the sliding contact surface of the commutator may have a plurality of peaks and valleys that are substantially regularly and alternately arranged in the circumferential direction of the commutator.

Furthermore, to achieve the objectives of the present invention, there is provided a method for manufacturing a dynamo-electric machine including a commutator secured around a rotatable shaft and a plurality of carbon brushes placed in sliding contact with the commutator. The method includes a step of processing a sliding contact surface of the commutator, which is placed in sliding contact with the plurality of carbon brushes upon assembly of the dynamo-electric machine, to form a plurality of peaks and valleys in the sliding contact surface of the commutator with use of a cutting apparatus and a vibration generating apparatus. The plurality of peaks and valleys are substantially regularly and alternately arranged in both axial and circumferential directions of the commutator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 5:
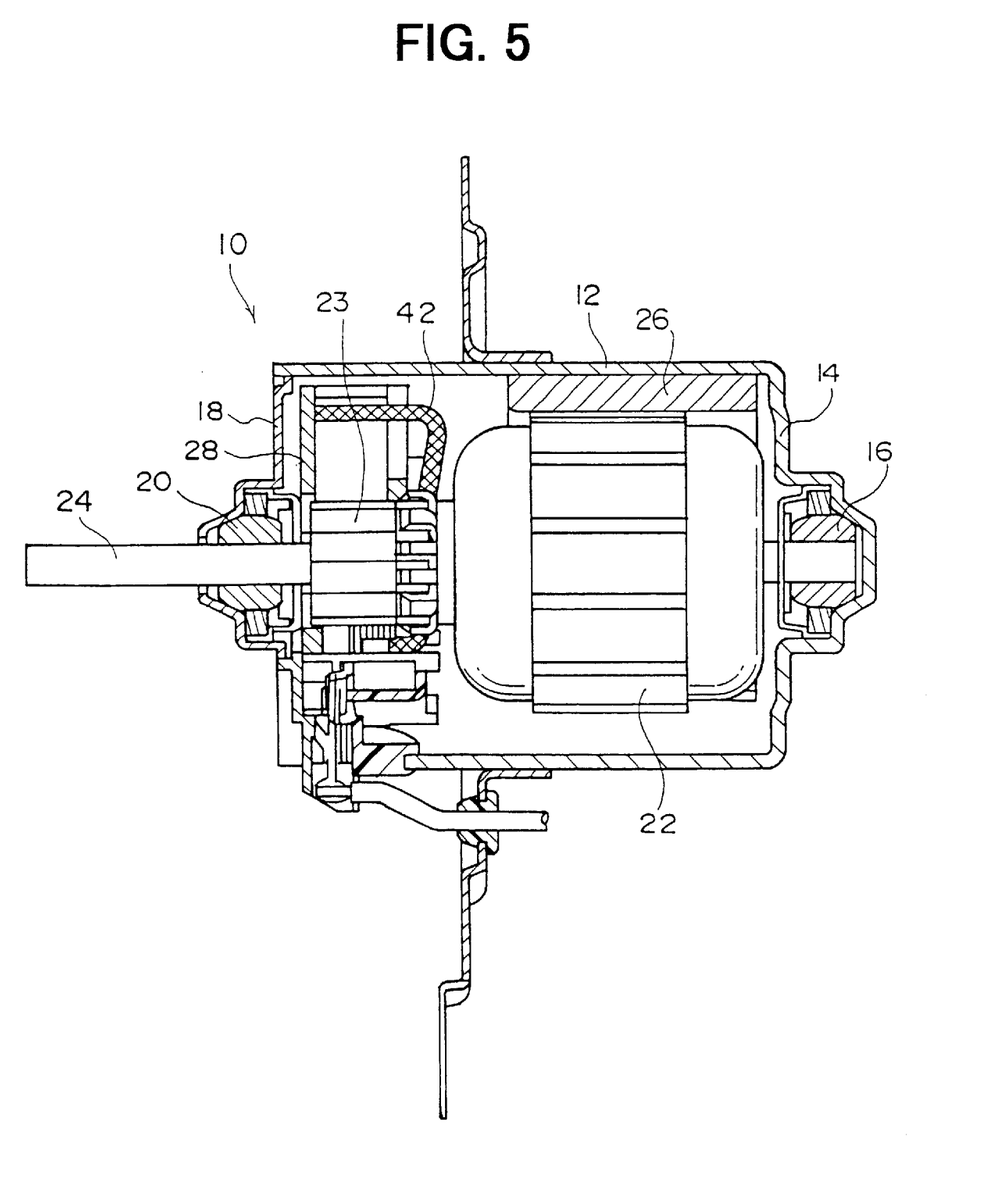
FIG. 5 is a longitudinal cross-sectional view of the motor.

FIG. 5 shows a longitudinal cross-sectional view of a motor 10 acting as a dynamo-electric machine according to the embodiment of the present invention.

A yoke housing 12 of the motor 10 is shaped into a cup shape and has a drawn axial end portion at one axial end (right end side of FIG. 5). A bearing 16 is placed at a base wall 14 of the drawn axial end portion of the yoke housing 12. An end housing 18 is secured to the other end of the yoke housing 12.

A bearing 20 is arranged at a center portion of the end housing 18. A rotatable shaft 24 of an armature 22 is rotatably supported by this bearing 20 and the bearing 16 of the yoke housing 12. The armature 22 is received in the yoke housing 12. Magnets 26 are secured to an inner peripheral wall of the yoke housing 12 in opposed relationship to the armature 22.

A holder plate 28 is placed between the armature 22 and the bearing 20. The holder plate 28 is made of a relatively thin synthetic resin material and is secured to the end housing 18 near the bearing 20.

Figure 6:
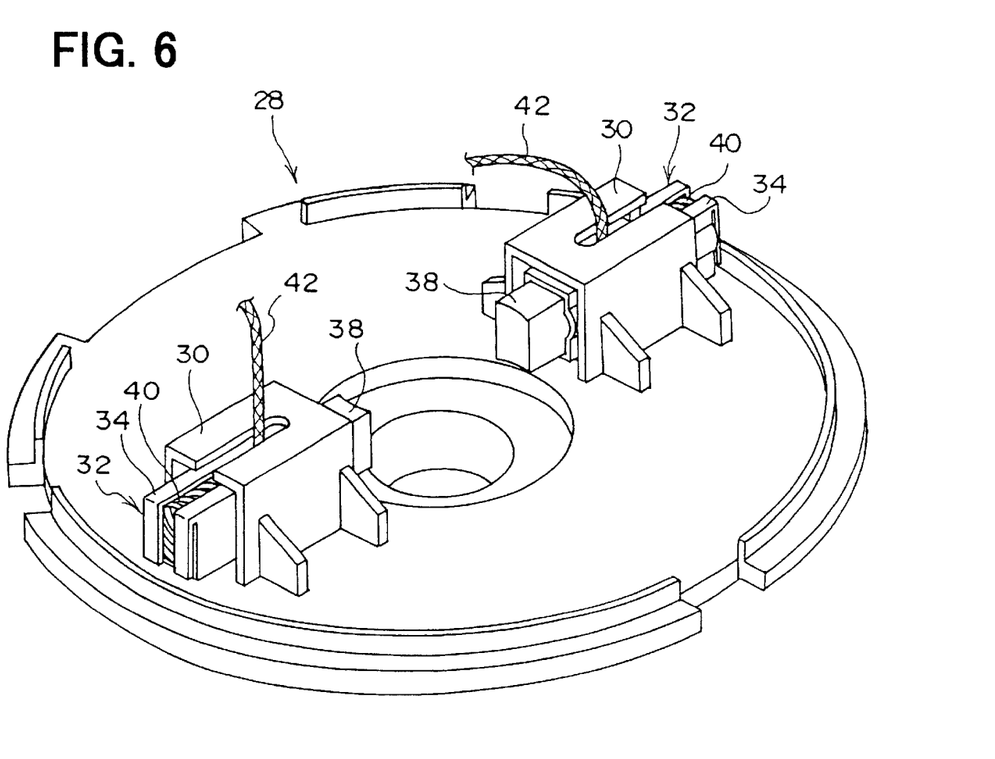
FIG. 6 is an enlarged perspective view of a holder plate of the motor, showing case housings and brush subassemblies.

As shown in FIG. 6, the holder plate 28 has a pair of case housings 30. Each case housing 30 is shaped into a box shape and is integrated into the holder plate 28. A longitudinal axis of each case housing 30 extends in a direction perpendicular to an axial direction of a commutator 23 of the armature 22. Each case housing 30 has open front and rear ends. Furthermore, each case housing 30 receives a corresponding brush subassembly 32.

Figure 7:
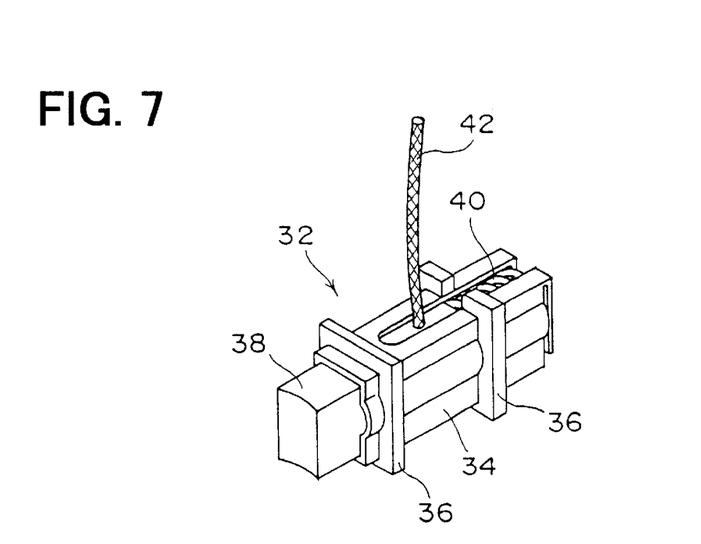
FIG. 7 is an enlarged perspective view of the brush subassembly of the motor.

With reference to FIG. 7, each brush subassembly 32 received in the corresponding case housing 30 includes a brush case 34. The brush case 34 is made of a metal material and is shaped into a box shape that corresponds to the shape of the case housing 30. A pair of resilient support elements 36 (in the present embodiment, each resilient support element 36 is made of a soft resin material or a rubber material) are arranged in an outer peripheral surface of the brush case 34 and are spaced in an axial direction of the brush case 34.

Each brush case 34 slidably receives a carbon brush 38 along with a spring 40. Each brush 38 can slide in the longitudinal direction of the brush case 34 (i.e., in a direction toward or away from an outer peripheral surface of the commutator 23, that is, in a radial direction of the commutator 23). Each brush 38 is shaped into a rectangular column and has small clearances between side surfaces of the brush 38 and opposing inner wall surfaces of the brush case 34. Furthermore, a distal end surface (sliding contact surface) of each brush 38 is generally arcuately shaped to make close contact with the outer peripheral surface (sliding contact surface) of the commutator 23.

Each spring 40 always urges the corresponding brush 38 in a direction away from the brush case 34, so that each brush 38 is urged against the commutator 23 of the armature 22. Furthermore, a pigtail 42 extends from each brush 38 and is connected to a power supply line.

As described above, each brush subassembly 32 is received in the corresponding case housing 30 and is supported on the holder plate 28 via the resilient support elements 36 of the brush case 34. That is, each brush case 34 (brush 38) is floatingly supported separately and independently from the other brush case 34 (brush 38).

Figure 2:
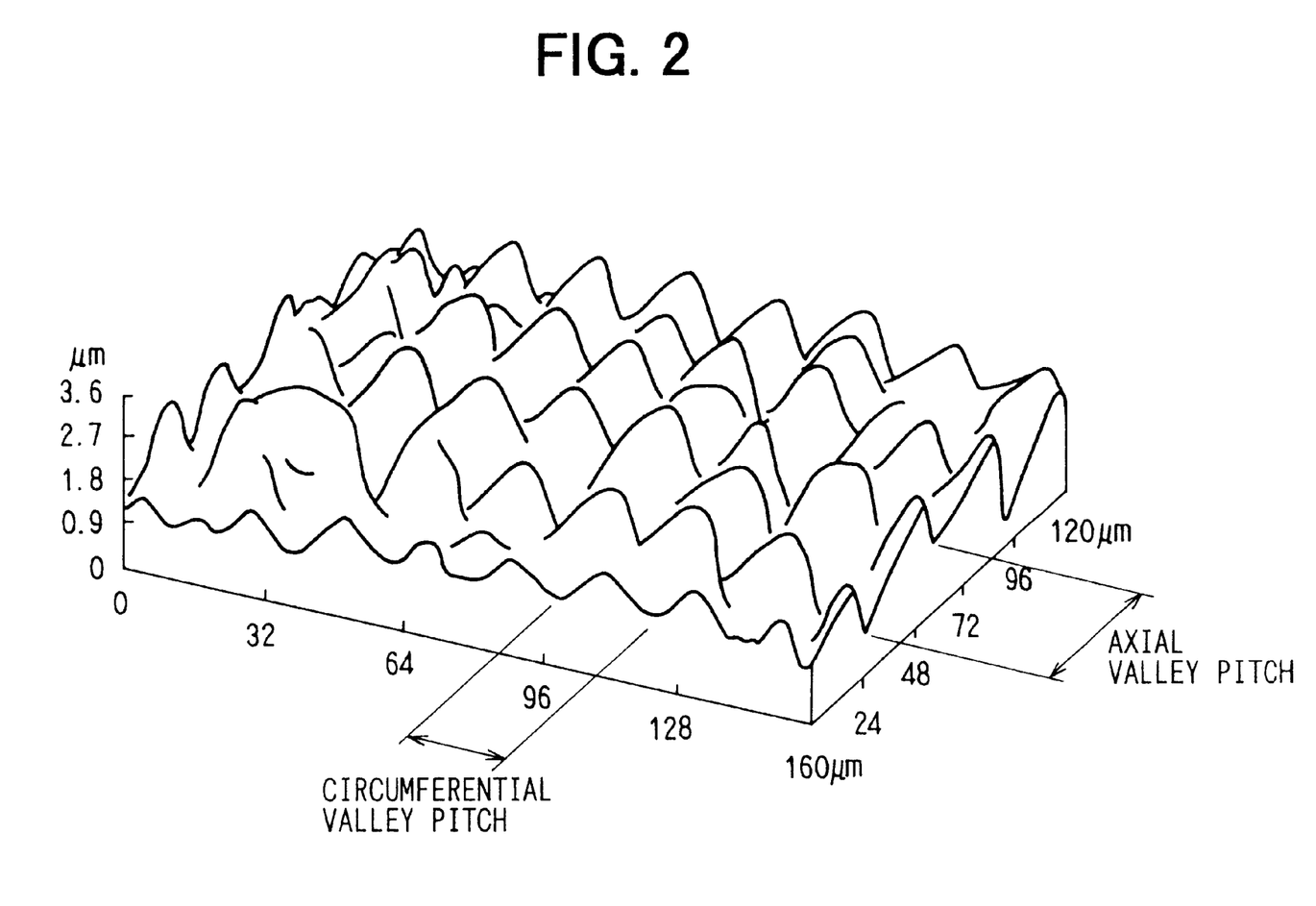
FIG. 2 is a magnified perspective schematic view of the peaks and valleys formed in the sliding contact surface of the commutator of the motor.

As shown in FIG. 2, the sliding contact surface of the commutator 23 includes a plurality of substantially regularly and alternately arranged peaks and valleys to form the rough sliding contact surface. When these peaks and valleys are seen from a top side in FIG. 2, they look like a mesh that extends in both the axial and circumferential directions of the commutator 23. That is, the peaks of the sliding contact surface constitute nodes of the mesh, and each adjacent two peaks or nodes are connected by an inwardly curved ridge. During an initial wearing period of the brushes 38, the brushes 38 make point contact or relatively small surface contact with the peaks of the rough sliding contact surface of the commutator 23.

With reference to FIG. 2, by way of example, the rough sliding contact surface of the commutator 23 may have a circumferential valley pitch of about 100 $\mu$m, an axial valley pitch of about 20 $\mu$m and a valley depth of about 0.8 $\mu$m. Furthermore, the rough sliding contact surface of the commutator 23 preferably has the surface roughness or the ten-point average roughness (Rz) of about 0.5–10.0 $\mu$m (the ten-point average rough ness is defined by the Japanese Industrial standard (JIS) B0601).

Figure 1:
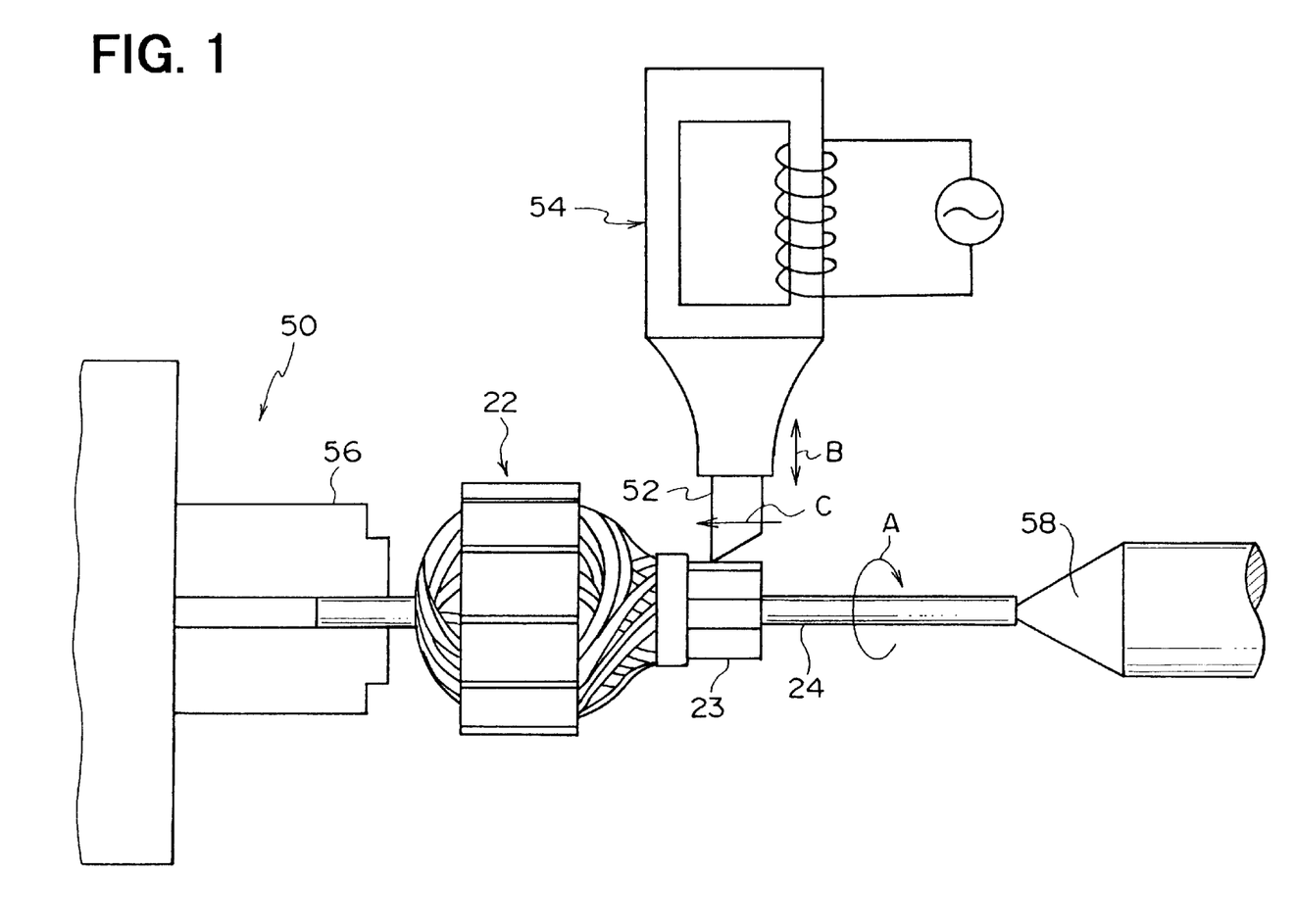
FIG. 1 is a schematic side view showing an apparaus and method for forming peaks and valleys of predetermined shapes in a sliding contact surface of a commutator of a motor according to an embodiment of the present invention.

With reference to FIG. 1, the peaks and the valleys in the sliding contact surface of the commutator 23 are formed by a lathe (cutting apparatus) 50 that has a single point tool 52 connected to and driven by an ultrasonic vibration generating unit (vibration generating apparatus) 54. The single point tool 52 has a cutting edge at its distal end.

A method for forming the peaks and valleys in the sliding contact surface of the commutator 23 as well as an operation of the motor 10 will be described below.

First, as shown in FIG. 1, one end of the shaft 24 of the armature 22 is held by a chuck 56 of the lathe 50, and the other end of the shaft 24 of the armature 22 is held by a jig 58. Then, the armature 22 is rotated at a predetermined rotational speed (e.g., about 6,000 to 14,000 rpm, preferably about 6,000 to 8,000 rpm) in a rotational direction A of FIG. 1, and also the single point tool 52 is placed to normally contact the sliding contact surface of the armature 23 during this operation and is vibrated at a predetermined frequency (e.g., about 10 to 40 kHz, preferably about 27 kHz) and a predetermined amplitude (e.g., about 15 $\mu$m) by the ultrasonic vibration generating unit 54 in a radial direction or direction B of FIG. 1 that is perpendicular to the axial direction of the commutator 23. At the same time, the single point tool 52, which normally contacts the sliding contact surface of the commutator 23 during this operation, is moved at a predetermined speed (e.g., about 0.02 to 0.08 mm/rev) in an axial direction C of FIG. 1.

In this manner, as shown in FIG. 2, the peaks and valleys having its predetermined shape and size are formed in the sliding contact surface of the commutator 23, which slidably contacts the brushes 38. In this instance, the shape and size of each one of the peaks and valleys can be changed to any desired shape and size by controlling the frequency and amplitude of the ultrasonic vibration applied to the single point tool 52, the axial moving speed of the single point tool 52, and/or the rotational speed of the commutator 23 (armature 22).

In the motor 10 that has the peaks and valleys in the sliding contact surface of the commutator 23, the pair of diametrically opposed brushes (cathode and anode) 38 slide along the sliding contact surface of the commutator 23 to supply electric power to the commutator 23.

In the motor 10, each brush 38 is received in the brush case 34, and the resilient support elements 36 are provided in the outer peripheral surface of the brush case 34. The brush case 34 is in turn supported by the corresponding case housing 30 of the holder plate 28 via the resilient support elements 36. That is, each brush case 34, which receives the corresponding brush 38, is independently, floatingly supported by the resilient support elements 36 provided in the outer peripheral surface of the brush case 34.

As a result, each brush 38 can be independently and accurately positioned with respect to the commutator 23, and positional deviation of each assembled brush 38 with respect to the commutator 23 is well restrained. Furthermore, during the operation of the motor 10, each brush 38 independently, effectively follows the contour (steps of the commutator segments) of the commutator 23, so that the diametrically opposed brushes 38 can be symmetrically and more accurately positioned with respect to the commutator 23. Thus, deviation of each brush 38 with respect to a rotational axis (magnetic pole center) of the armature 22 is effectively restrained. In this way, the commutation is not disturbed, and deterioration of motor efficiency as well as generation of vibrations in the armature 22 can be effectively reduced.

Also, in the motor 10, during the initial wearing period of the brushes 38, the brushes 38 make the point contact or small surface contact with the peaks of the sliding contact surface of the commutator 23.

Figure 3:
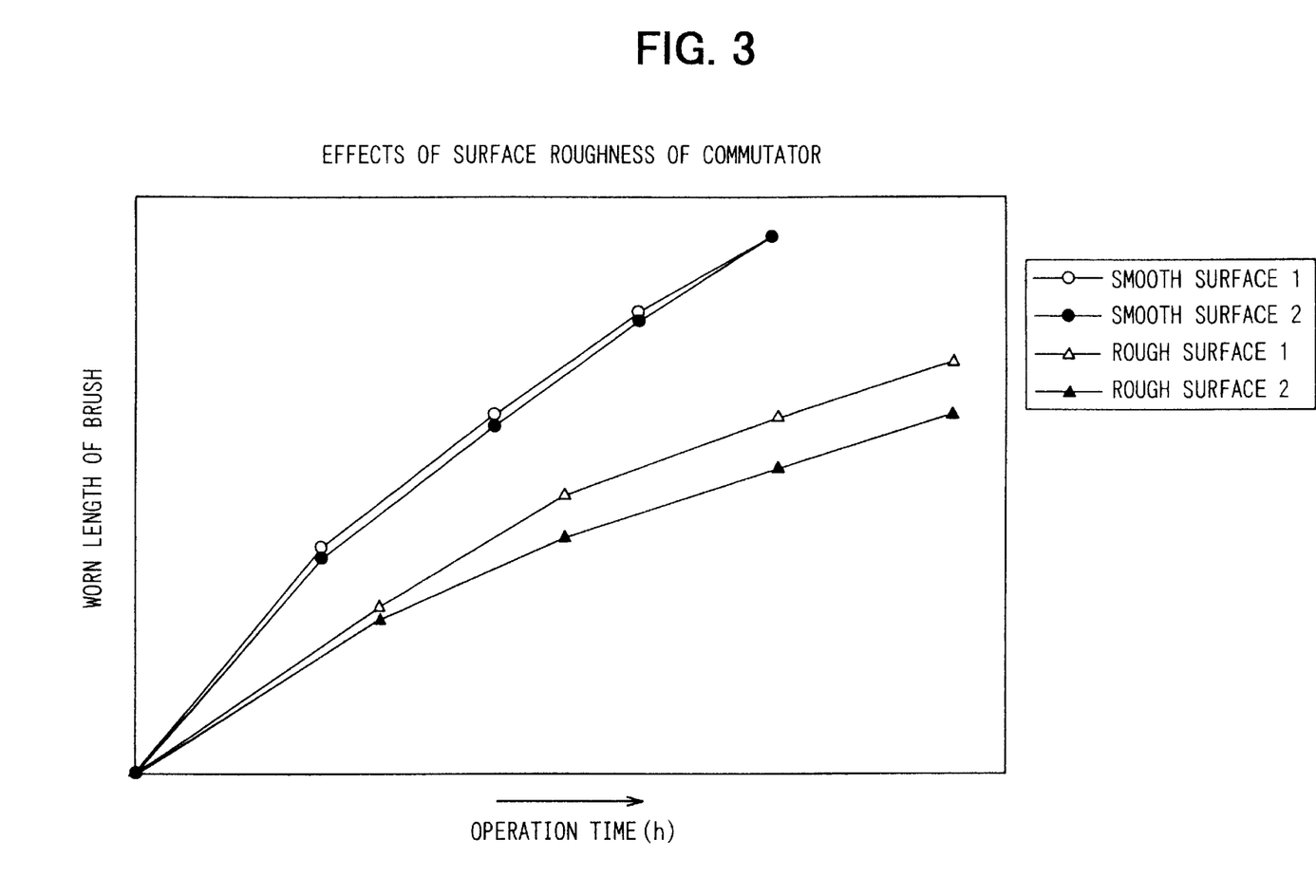
FIG. 3 is a graph showing a relationship between a worn length of a brush of the motor and operation time of the motor measured for smooth sliding contact surfaces and rough sliding contact surfaces.

Thus, the sliding friction generated between the brushes 38 and the sliding contact surface of the commutator 23 is stabilized, and hence squealing noise and abnormal wearing of brushes 38 are effectively reduced. FIG. 3 shows a relationship between an amount of wearing (worn length) of the brush 38 and operation time of the motor 10 measured for the commutators having a smooth sliding contact surface (i.e., having no peaks and valleys formed in the above manner) and the commutators having the rough sliding contact surface (i.e., having the peaks and valleys formed in the above manner). As seen in FIG. 3, when the peaks and valleys are provided in the sliding contact surface of the commutator 23, the wearing of the brush 38 is greatly reduced.

Figure 4A:
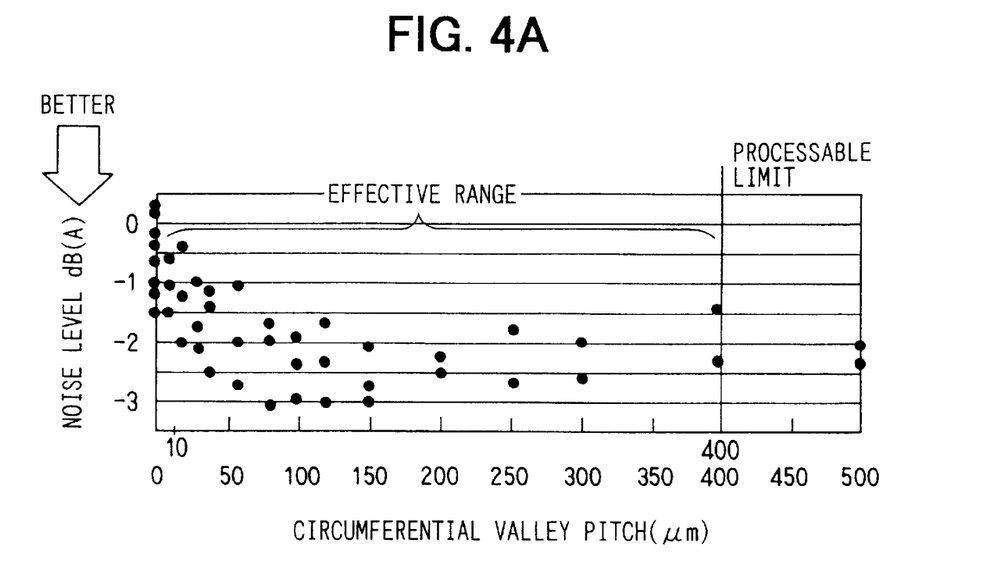
FIG. 4A is a graph showing a relationship between a noise level and a circumferential valley pitch of the sliding contact surface of the commutator.

FIG. 4A shows a relationship between the noise level and the circumferential valley pitch of the sliding contact surface of the commutator 23 in the motor 10. As seen in FIG. 4A, the circumferential valley pitch of the sliding contact surface of the commutator 23 is closely related to the noise level. On the other hand, when the circumferential valley pitch is excessively increased, the total contact surface area between the commutator 23 and each brush 38 is reduced, and hence the power supply becomes unstable, causing disturbance of the commutation and reduction of the motor efficiency. Thus, in order to achieve both "the noise reduction" as well as "the stable commutation and good motor efficiency", the circumferential valley pitch is preferably in a range of about 10–400 $\mu$m. In this way, the disturbance of the commutation and the reduction of the motor efficiency are well restrained, and the noises are also substantially reduced.

Figure 4B:
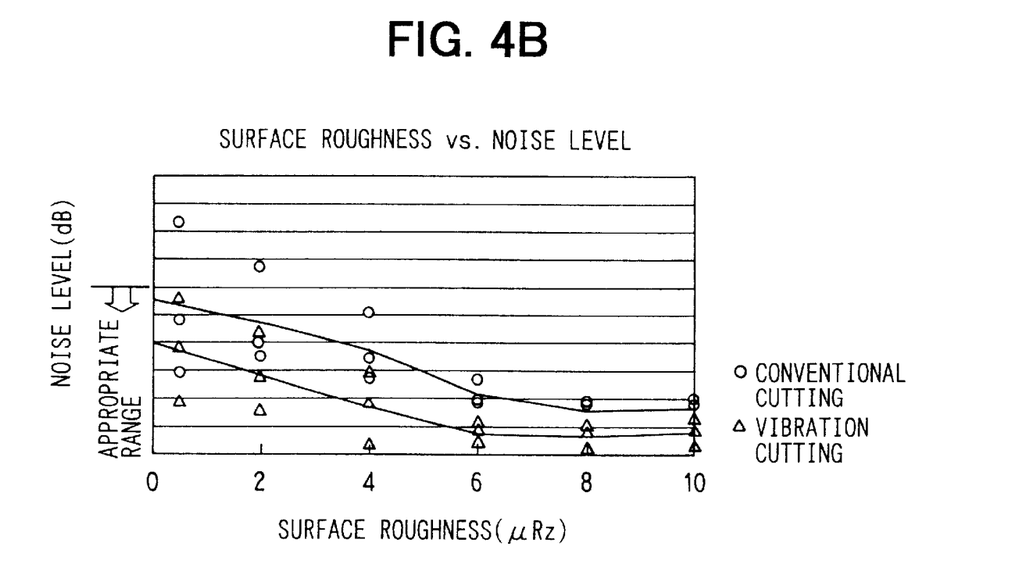
FIG. 4B is a graph showing a relationship between a noise level and a surface roughness of the sliding contact surface of the commutator.

FIG. 4B shows a relationship between the noise level and the surface roughness of the sliding contact surface of the commutator 23 in the motor 10. As seen in FIG. 4B, the surface roughness (Rz) of the sliding contact surface of the commutator 23 is closely related to the noise level. On the other hand, an excessive increase in the surface roughness (Rz) of the sliding contact surface of the commutator 23 is not desirable in terms of the current (practical) processing technique and also in terms of the manufacturing cost. Thus, in order to achieve both "the noise reduction" and "the stable commutation and good motor efficiency", the surface roughness or the ten-point average roughness (Rz) is preferably in a range of about 0.5–10.0 $\mu$m. In this way, the sliding friction between the brushes 38 and the sliding contact surface of the commutator 23 is further stabilized, so that the disturbance of the commutation and the reduction of the motor efficiency are well restrained, and the noise is also substantially reduced.

The size of each one of the peaks and valleys is relatively very small in comparison to the sizes of the components that affect, for example, the roundness of the outer peripheral surface of the commutator 23, the size of each step formed between the corresponding adjacent commutator segments of the commutator 23, the deviation between the brush position of each brush 38 and the corresponding rotational position of the armature 22 (commutator 23) or the like. Thus, the peaks and valleys of the sliding contact surface of the commutator 23 do not cause deterioration of the commutation performance of the commutator 23 and the brushes 38, the reduction of the motor efficiency as well as the generation of substantial vibrations and noises in the armature 22.

Furthermore, hardness of each brush 38, which includes a graphite material, is less than hardness of each commutator segment of the commutator 23. Thus, during the operation of the motor 10 (during the rotation of the armature 22), the brushes 38 mainly wear while the commutator segments of the commutator 23 experience little or no wear. That is, the brushes 38 are scraped by the peaks of the sliding contact surface of the commutator 23 during the operation of the motor 10. Then, powder byproduct generated or scraped from the brushes 38 fill the valleys of the sliding contact surface of the commutator 23 and act as lubricant powder that reduces friction between the sliding contact surface of the commutator 23 and the sliding contact surface of each carbon brush 38. Thus, more smooth sliding contact is achieved between each brush 38 and the commutator 23, resulting in a further reduction of the vibrations.

As a result, by appropriately setting the shapes of the peaks and valleys in the sliding contact surface of the commutator 23, the disturbance of the commutation, the reduction of the motor efficiency, the generation of vibrations and vibrational noise of the armature 22 and the like can be effectively restrained. Furthermore, the squealing noise of the brushes 38 and the abnormal wearing of the brushes 38 can be reduced.

As described above, the motor 10 and the manufacturing method thereof according to the present embodiment can restrain the disturbance of the commutation, the reduction of the motor efficiency, the generation of the vibrations and vibrational noise of the armature 22 and the like and can also reduces the squealing noise of the brushes 38 and the abnormal wearing of the brushes 38.

In the above embodiment, the ultrasonic vibrations are applied to the single point tool 52 of the lathe 50 from the ultrasonic vibration generating unit 54, and the peaks and valleys of the predetermined shapes are generated in the sliding contact surface of the commutator 23 through the single point tool 52. However, the peaks and valleys of the sliding contact surface of the commutator 23 can be alternatively formed by any other manner. For example, it is possible to use an electrical discharge machining system that forms the peaks and valleys in the sliding contact surface of the commutator 23 through an electrical discharge machining process. Furthermore, it is possible to use a rolling machine that forms the peaks and valleys in the sliding contact surface of the commutator 23 by applying compressive forces on the sliding contact surface through a rolling process.

In the above embodiment, in the process of forming the peaks and valleys in the sliding contact surface of the commutator 23, the single point tool 52 normally contacts against the sliding contact surface of the commutator 23. However, the single point tool 52 can be vibrated such that the single point tool 52 is intermittently detached away from the sliding contact surface of the commutator 23, for example, when the single point tool 52 reaches the top end point of its vibrational motion. In so doing, in stead of forming wavy peaks and valleys, generally, regularly spaced recesses are formed along the sliding contact surface of the commutator 23.

In the above embodiment, the peaks and valleys are continuously formed in the sliding contact surface of the commutator 23 in both the axial and circumferential directions along, for example, a continuous helical path. However, it is possible to form the peaks and valleys along one circumferential path or along a plurality of circumferential paths that are axially spaced from each other. For instance, the peaks and valleys can be formed along the one circumferential path by rotating the armature 22 for 360 degrees while the single point tool 52 is vibrated against the sliding contact surface of the commutator 23 without moving the single point tool 52 in the axial direction. Furthermore, it is also possible to form the peaks and valleys along one axial path or along a plurality of axial paths that are circumferentially spaced from each other. For instance, the peaks and valleys can be formed along the one axial path by moving the single point tool 52 in the axial direction without rotating the armature 22.

Furthermore, the frequency and amplitude of the ultrasonic vibration applied to the single point tool 52, the axial moving speed of the single point tool 52, and/or the rotational speed of the commutator 23 are not limited to the values discussed in the above embodiment and can be modified to any other appropriate values. For example, in the above embodiment, the armature 22 is rotated in the range of about 6,000 to 14,000 rpm. However, if the lathe 50 or any other apparatus can rotate the armature 22 higher than this range without causing generation of excessively high frictional heat, the armature 22 can be rotated at the speed higher than this range, so that the circumferential valley pitch can be increased beyond 400 μm.

Additional advantages and modifications will readily occur to those skilled in the art. The invention in its broader terms is therefore, not limited to the specific details, representative apparatus, and illustrative examples shown and described.

What is claimed is:

1. A dynamo-electric machine comprising:

a commutator secured around a rotatable shaft; and a plurality of carbon brushes placed in sliding contact with said commutator, wherein said commutator has a sliding contact surface placed in sliding contact with said plurality of carbon brushes, said sliding contact surface of said commutator having a plurality of peaks and valleys that are substantially regularly and alternately arranged in both axial and circumferential directions of said commutator.

2. A dynamo-electric machine according to claim 1, wherein a circumferential pitch of said valleys measured in said circumferential direction of said commutator is in a range of about 10 to 400 μm.

3. A dynamo-electric machine according to claim 1, wherein a ten-point average roughness (Rz) of said sliding contact surface of said commutator is in a range of about 0.5–10.0 μm.

4. A dynamo-electric machine according to claim 1, wherein said plurality of peaks and valleys of said sliding contact surface of said commutator are constructed in such a manner that said peaks of said sliding contact surface of said commutator scrape a sliding contact surface of each said carbon brush placed in sliding contact with said sliding contact surface of said commutator, and carbon brush powder scraped from said sliding contact surface of said each carbon brush is accumulated in said valleys of said sliding contact surface of said commutator and acts as lubricant powder that reduces friction between said sliding contact surface of said commutator and said sliding contact surface of said each carbon brush.

5. A dynamo-electric machine according to claim 1, wherein said plurality of peaks and valleys of said sliding contact surface of said commutator are arranged along a helical path on said sliding contact surface of said commutator.

6. A dynamo-electric machine according to claim 1, wherein said plurality of peaks and valleys of said sliding contact surface of said commutator are arranged to form a mesh-like structure, said peaks constituting nodes of said mesh-like structure, each adjacent two peaks being interconnected by an inwardly curved ridge.

7. A dynamo-electric machine comprising:

a commutator secured around a rotatable shaft; and a plurality of carbon brushes placed in sliding contact with said commutator, wherein said commutator has a sliding contact surface placed in sliding contact with said plurality of carbon brushes, said sliding contact surface of said commutator having a plurality of peaks and valleys that are substantially regularly and alternately arranged in a circumferential direction of said commutator.

8. A dynamo-electric machine according to claim 7, wherein a circumferential pitch of said valleys measured in said circumferential direction of said commutator is in a range of about 10 to 400 μm.

9. A dynamo-electric machine according to claim 7, wherein said plurality of peaks and valleys of said sliding contact surface of said commutator are arranged along at least one circumferential path that extends in said circumferential direction of said commutator.

* * * * *